United States Patent [19]

Maeda et al.

[11] 4,322,768
[45] Mar. 30, 1982

[54] MULTI-TERMINAL PROTECTIVE RELAY SYSTEM

[75] Inventors: Kouji Maeda; Tadahiro Goda, both of Kobe, Japan

[73] Assignee: Mitsubishi Denki Kabushiki Kaisha, Tokyo, Japan

[21] Appl. No.: 244,860

[22] Filed: Mar. 18, 1981

[30] Foreign Application Priority Data

Mar. 25, 1980 [JP] Japan ................................. 55-39820

[51] Int. Cl.³ ............................................ H02H 7/26
[52] U.S. Cl. ....................................... 361/64; 324/51; 361/68
[58] Field of Search ...................... 361/64, 66, 68, 69; 371/34, 67, 68, 71; 324/51

[56] References Cited

U.S. PATENT DOCUMENTS 3,590,368  6/1971  Esclangon ........................ 361/68 X
4,183,072  1/1980  Takagi et al. ...................... 361/68
4,228,476  10/1980  Okita et al. ...................... 361/68

FOREIGN PATENT DOCUMENTS

49-114752  11/1974  Japan .

*Primary Examiner*—Reinhard J. Eisenzopf
*Attorney, Agent, or Firm*—Wenderoth, Lind & Ponack

[57] ABSTRACT

At each of terminal connected to a protected line section a current is sampled at an identical high sampling frequency, digitized, encoded and transmitted to an associated one of the terminals with the digitized data registered in a first buffer memory. Those processes are conducted under the control of respective clock pulses. Also a receiver receives similar data from the associated terminal. The received data are decoded and registered in a second buffer memory under the control of control signals from the receiver. A shift register successively receives the data from the first buffer memory and shifts them through it under the control of a shifting pulse to compensate for a known transmission delay between the data in the two buffer memories. The shift register and the second buffer memory write respective data into a processing unit in response to a writing pulse having a pulse width of a sampling pulse multiplied by an integer from the processing unit. The processing unit compares two sets of data with each other to determine if a fault occurs within the protected section.

1 Claim, 11 Drawing Figures

MULTI-TERMINAL PROTECTIVE RELAY SYSTEM

BACKGROUND OF THE INVENTION

The present invention relates to the protection of a multi-terminal electric system based on current differential principles and more particularly to a synchronizing system for digital quantities obtained from currents through respective terminals of an associated multi-terminal transmission line.

The establishment of transmission lines has the tendency to include a multitude of terminals, for example, three or four terminals due to such problems as the difficulty of securing their sites, the preservation of the environment etc. This has resulted in the demand that associated protective relay systems be improved in both performance and reliability. Multi-terminal systems have encountered the problems such as internal faults attended with a charging current developed in the protective section thereof and an efflux from the latter, the passage of a power flow through the protective section thereof etc. Thus the multi-terminal systems have been difficult to be protected by the prior art such as the phase comparison relay system.

In order to avoid this difficulty, there have been alreadily proposed current differential protective systems employing the vectorial sum of currents through all terminals of an associated multi-terminal transmission line. Those current differential protective systems have many advantages in view of the protection. For example, those systems utilize the simple principles based on the first Kirchhoffs' law and are high in ability to sense faults. Further they are free from any malfunction such as a power disturbance and the pulling-out and unrequired to compromise their sensitivity with their timings. Therefore the current differential protective systems are suitable for protecting multi-terminal systems.

In order to materialize current differential protective systems as described above, there have been previously proposed simultaneous sampling systems having the digital technique introduced thereinto. One example of those current differential protective systems has fundamentally comprised means for sampling and digitalizing a current flowing through each of two terminals of protected section of a transmission line involved, a transmitter, a receiver and a processing unit disposed at each of those terminals. At each terminal current data thus formed are transmitted to the receiver at the other terminal and the processing unit has compared the current data with similar data resulting from the other terminal. When a fault has occurred within the protected section as determined thereby, the processing unit is operated to trip an associated circuit breaker to disconnect the protected section from the transmission line.

In conventional current differential protective systems such as described above current have been required to be simultaneously sampled at all terminals resulting in a complicated synchronizing circuitry. In addition, as the entire system is operated in time synchronized state, there have been fears that the occurrence of an abnormality on the synchronizing circuitry disables not only the function of protecting the entire system but also all the functions including measurements, adjustments, operation etc. employing data in common with the protective function. Further the non-accommodation to the enlargement of equipments has become remarkable with an increase in number of substations connected to a transmission line involved.

Accordingly it is an object of the present invention to provide a new and improved multi-terminal protective relay system operative on the basis of current differential principles with a simple construction and with an accuracy capable of being sufficiently put to practical use.

SUMMARY OF THE INVENTION

The present invention provides a multi-terminal protective relay system for protecting a transmission line on the current differential principles, comprising at each of a plurality of terminals connected to a transmission line, means for drawing a current in the analog form flowing therethrough, analog-to-digital converter means connected to the current drawing means, encoder means connected to the analog-to-digital converter means, transmitter means connected to the encoder means, receiver means, decoder means connected to the receiver means, first buffer memory means connected to the analog-to-digital converter means, second buffer memory means connected to the decoder means, transmission delay corrector means connected to the first buffer memory means, clock means for delivering control signals to the analog-to-digital converter means, the encoder means, the transmitter means, the first buffer memory means, and the transmission delay corrector means, and processing means connected to the transmission delay corrector means and the second buffer memory means thereby to eliminate the necessity of preparing a synchronizing signal for the analog-to-digital converter means disposed on the plurality of terminals.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENTS

Any current differential protective system is operated in accordance with the fundamental principles based on the first Kirchhoffs' law. In other words, the system utilizes the fact that, upon a fault occurring externally of a protected section of an electric system involved and in the sound state of the protected section, currents through all terminals of the protected section have the vectorial sum equal to a null value while that vectorial sum is not equal to the null value upon a fault occurring within the protected section.

Actually it is required to consider errors occurring in a measuring system disposed in the current differential protective systems and the latter system is operated in accordance with the inequality expressed by $$\left| \sum_{j=1}^{n} Ij \right| - k \sum_{j=1}^{n} | Ij | > T_o \quad (1)$$

where Ij designates a current through a terminal j as a vector, k a restraint factor and $T_o$ designates a constant determining a minimum sensitivity of the current differential protective system. In the inequality (1) the term $$\left| \sum_{j=1}^{n} Ij \right|$$

designates the absolute value of the vectorial sum of the currents through all the terminals and represents an operating force while the term $$\sum_{j=1}^{n} | Ij |$$

designates the sum of the absolute values of all those currents and represents a restraining force. What holds the inequality (1) is called "a scalar sum restraining system" and usually employed in many cases.

When the inequality (1) holds, the system performs the protective operation, for example, the operation of tripping an associated circuit breaker.

Figure 1:
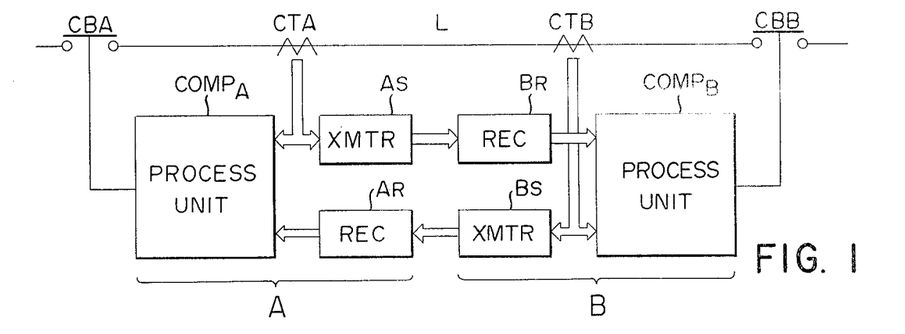
FIG. 1 is a combined circuit and block diagram illustrating the fundamental construction of a conventional current differential protective systems.

In order to materialize the current differential protective system as described above, there has been previously proposed a simultaneous sampling system utilizing digital technique such as shown in FIG. 1 of the drawings. In the arrangement illustrated, a protected section L of a transmission line is connected to adjacent sections thereof through respective circuit breakers CBA and CBB and includes at each of both terminals A or B, a current transformer CTA or CTB operatively coupled to the section of the transmission line, a transmitter $A_S$ or $B_S$ connected to the current transformer CTA or CTB, and a receiver $A_R$ or $B_R$ receiving data from the transmitter $B_S$ or $A_S$ and a processing circuit $COMP_A$ or $COMP_B$.

An analog quantity developed, as an independent event at each of the terminals A or B is digitalized and then transmitted to the receivers $B_R$ or $A_R$ through the transmitter $A_S$ or $B_S$ following by its introduction into the processing unit $COMP_B$ or $COMP_A$ respectively.

The construction as described above has resulted in the fundamentals of current differential protective systems.

In order that the arrangement of FIG. 1 holds the first Kirchhoffs' law faithfully, it has been required to send strict data occurring from one moment to the next at at each of the terminals to the other terminal and compare the data occurring at each terminal with that transmitted from the other terminal for processing purposes. This has resulted in the necessity of increasing the accuracy therefor with an increase in number of terminals and therefore in the demand that the sampling time point at all the terminals have the simultaneous synchronism.

To this end, it has been a common practice to transmit a sampling synchronizing signal from the master station to subordinate stations thereof, effecting the sampling at each of the subordinate stations in response to the transmitted sampling synchronizing signal while at the same time returning the synchronizing signal back to the master station from each of the subordinate stations. Meanwhile the master station has sensed a time interval between transmission of the sampling synchronizing signal to each of the subordinate stations and the receipt of that signal returned back thereto from each subordinate station. Thereby the master station has adjusted the time point where the sampling synchronizing signal is transmitted to the subordinate stations so that the master station effects the sampling in synchronization with that the sampling time at each of the subordinate stations.

Under these circumstances, the entire system has been operated in the time synchronized state of the simultaneous synchronization type and has resulted in the following disadvantages: A complicated synchronizing circuitry is not only required but also such fears are caused that the occurrence of an abnormality on that synchronizing circuitry disables not only the function of protecting the entire system but also all the functions including measurements, adjustments, operations etc. using data in common with the protective function. Further when it is attempted to increase the number of substations tied to the particular transmission line then the nonaccommodation to the enlargement of equipments becomes remarkable as the number of associated electrical stations increases.

In order to eliminate the disadvantages of the prior art practice as described above, the present invention provides a multi-terminal protective relay system operative on the basis of the current differential principles and having sampling frequencies coinciding with one another at all electric stations connected to an associated transmission line but not relying on the time synchronization. At each terminal current data in the analog form are sampled at the common sampling frequency increased in magnitude and then digitalized. The digitalized data are transmitted and received between the opposing terminals while a transmission delay time at each terminal is corrected within a sampling time period multiplied by an integer so that the samping is effected at each terminal with an accuracy able to be regarded as being substantially equivalent to an accuracy with which data are simultaneously sampled at predetermined time intervals satisfying an algorithm involved and at all the terminals. This results in an accuracy capable of being satisfactorily put to practical use.

Figure 2:
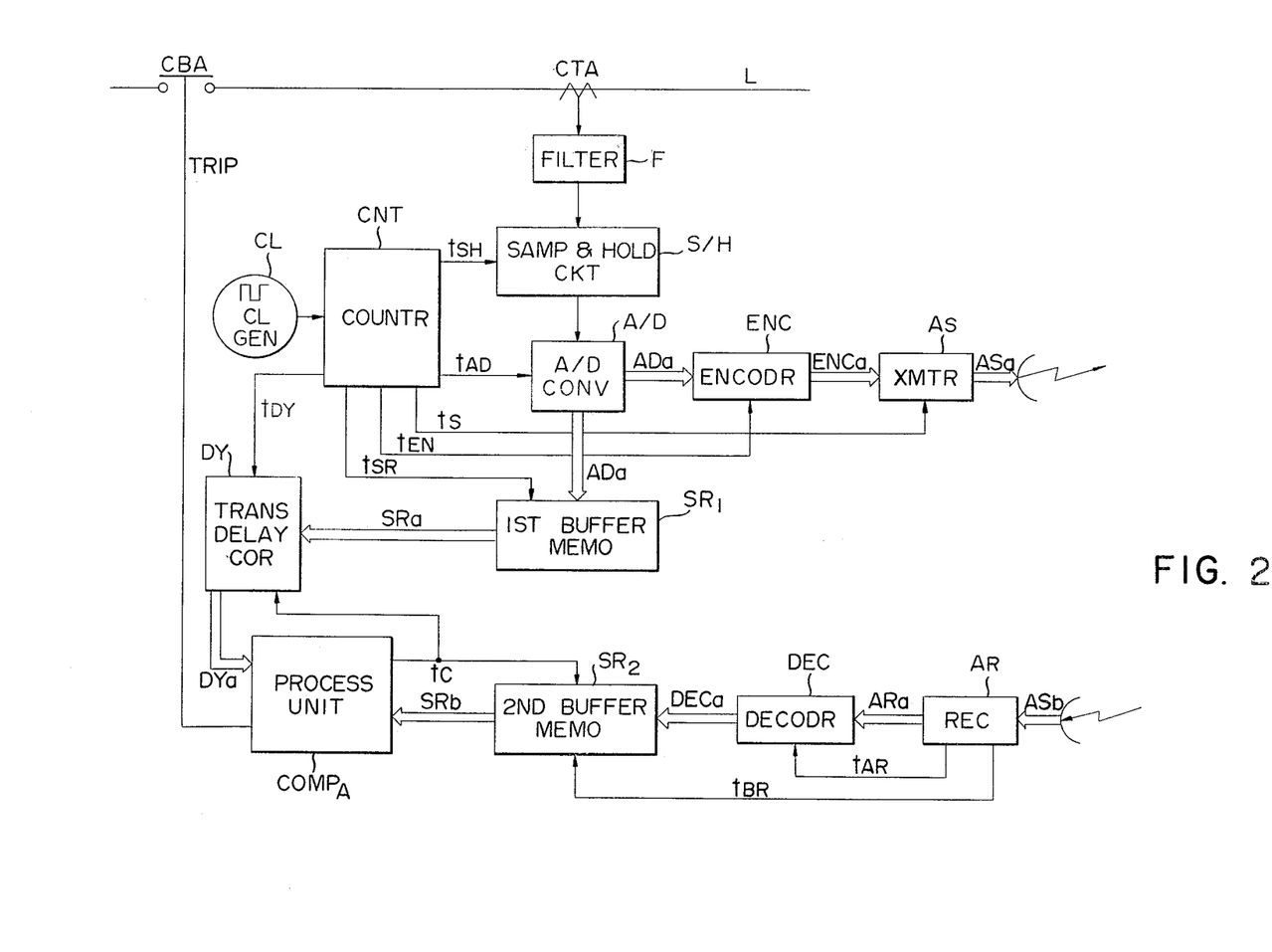
FIG. 2 is a combined circuit and block diagram of one embodiment according to the multi-terminal protective relay system of the present invention.

Referring now to FIG. 2, there is illustrated one embodiment according to the multi-terminal protective relay system of the present invention. FIG. 2 shows only an installation at a single terminal corresponding to the terminal A illustrated in FIG. 1 while that at the other terminal such as the terminal B shown in FIG. 1 is omitted only for purposes of illustration. As in FIG. 1, the arrangement illustrated comprises a protected section L of a transmission line connected to an adjacent protected section thereof through a circuit breaker CBA and a current transformer CTA electromagnetically coupled to the protected section L at its position adjacent to the circuit breaker CBA.

The arrangement further comprises a filter F connected to the current transformer CTA, a sampling and holding circuit S/H, an analog-to-digital converter A/D, an encoder ENC and a transmitter AS connected inseries to one another in the named order. The filter F removes turn-back errors as determined by the sampling theory and the sampling and holding circuit S/H serves to form samples. The analog-to-digital converter A/D is also connected to a first buffer memory $SR_1$, in this case, a shift register.

A clock generator CL is connected to a counter CNT subsequently connected to the sampling and holding circuit S/H, the analog-to-digital converter A/D, the encoder ENC, the transmitter $A_S$ and first buffer memory $SR_1$ through respective clock leads.

The first buffer memory $SR_1$ is further connected to a transmission delay corrector DY subsequently connected to a processing unit $COMP_A$. The counter CNT is also connected to the processing unit $COMP_A$ through a clock lead.

The arrangement comprises further a receiver $A_S$, a decoder DEC, a second buffer memory $SR_2$, in this case, a shift register, and the processing unit $COMP_A$ serially interconnected in the named order. Also the receiver AR is connected to the decoder DEC and the second buffer memory $SR_2$ through respective clock leads. Then the processing unit $COMP_A$ is further connected to the circuit breaker CBA.

Figure 3:
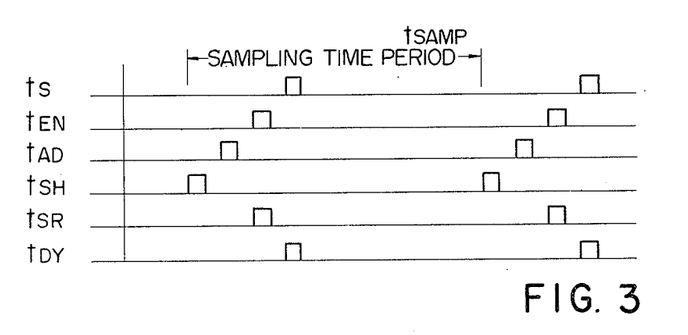
FIG. 3 is a graph illustrating a plurality of clock pulses generated by the counter shown in FIG. 2 to control the operating of the arrangement shown in FIG. 2.

A train of clock pulses is generated by the clock generator CL and applied to the counter CNT. The counter CNT is in the form of a cascade multi-stage counter and generates successively a plurality of clock pulses one for each stage within each of sampling time periods as shown in FIG. 3. In FIG. 3, a sampling and holding clock pulse $t_{SH}$ is shown as being generated at the beginning of the sampling time period $t_{SAMP}$ and followed by an analog-to-digital conversing clock pulse $t_{AD}$ which is, followed by an encoding clock pulse $t_{EN}$. Finally, a transmission clock pulse $t_S$ is generated. All those pulses are identical in pulse width to one another and developed at substantially equal time intervals. Further two clock pulses $t_{SR}$ and $t_{DY}$ are shown in FIG. 3 as being generated simultaneously with the clock pulses $t_{EN}$ and $t_S$ respectively and identical in pulse width to the latter pulses.

The sampling and holding clock pulse $t_{SH}$ is applied to the sampling and holding circuit S/H to cause the latter to sample a primary electric quantity of an associated transmission system, in this case, a secondary current from the current transformer CT filtered by the filter F. The sampling and holding circuit S/H holds the current thus sampled until the circuit S/H receives the next succeeding sampling and holding clock pulse $t_{SH}$.

Then the analog-to-digital converter A/D is responsive to the analog-to-digital conversion clock pulse $t_{ad}$ applied thereto to convert the sampled current applied at that time thereto to corresponding parallel digital data $AD_a$. The digital data $AD_a$ is applied to the encoder ENC.

The encoder ENC responds to the encoding clock pulse $t_{EN}$ applied thereto to encode the digital data $AD_a$ into coded data and add to the coded data with a check code such as "CRC" or the like to form a coded parallel signal $ENC_a$.

The coded signal $ENC_a$ is applied to the transmitter $A_S$. The transmitter $A_S$ is responsive to the transmission clock pulse $t_S$ to convert the coded parallel signal $ENC_a$ to corresponding serial signal $AS_a$ which is, in tirn, transmitted to an associated terminal of the protective section L such as the terminal B shown in FIG. 1.

The associated terminal is provided with the same arrangement as shown in FIG. 2 and transmits to the terminal A or the arrangement shown in FIG. 2 a serial signal $AB_b$ formed in the same process as described above, although the associated terminal and the arrangement installed thereat are not illustrated only for purposes of illustration.

The receiver AR receives the serial signal $AS_b$ from a transmitter (not shown) identical to that shown in FIG. 2 and disposed at the associated terminal. In the receiver $A_S$ the received serial signal $AS_b$ is subjected to the serial-to-parallel conversion after which control or clock pulses $t_{BR}$ and $t_{AR}$ are formed of a frame synchronizing word and an end-of-frame word included in the received signal $AS_b$ as will be described in conjunction with FIG. 7 hereinafter. Also a parallel signal $AR_a$ is delivered to the decoder DEC.

The decoder DEC is responsive to the clock pulse $t_{AR}$ from the receiver AR to check and decode the signal $AR_a$ while the second buffer memory $SR_2$ is responsive to the clock pulse $t_{BR}$ from the receiver AR to receive a decoded signal $DEC_a$ from the decoder DEC.

On the other hand, the first buffer memory $SR_1$ is responsive to the control pulse $T_{SR}$ from the counter CNT to receive the digital signal $AD_a$ from the analog-to-digital converter A/D. Then the transmission delay corrector DY writes thereinto an output signal $SR_a$ from the first buffer memory $SR_1$ in response to the control pulse $t_{DY}$ from the counter CNT which will be described in detail in conjunction with FIG. 6 later.

The processing unit $COMP_A$ is shown in FIG. 2 as applying a pulse $t_c$ to both the transmission delay corrector DY and the second buffer memory device $SR_1$. That pulse $t_c$ is a writing pulse and between the same and the clock pulse $t_{DY}$ from the counter CNT the following relationship is fulfilled:

$$nt_{DY} = t_c \qquad (2)$$

where n designates a positive integer. The writing pulse $t_c$ is generally determined by the algorism executed by the processing unit $COMP_A$ and the pulse width or duration thereof is preferably set to a time interval giving an electrical angle of a commercial frequency wave with a frequency of 60 or 50 hertzs equal to that of 90 degrees thereof divided by an integer. The transmission delay corrector DY and the second buffer memory $SR_2$ are responsive to the writing pulse $t_c$ to write into the processing unit $COMP_A$ data $DY_a(t_1)$ and $SR_b(t_1+\alpha)$ equivalent to those sampled substantially at the same time point respectively where $\alpha$ will be defined hereinafter. The processing unit $COMP_A'$ calculates the written data in accordance with the inequality (1). When the circuit breaker CBA is required to be tripped as determined thereby, the processing unit $COM_A$ delivers a tripping signal trip to a trip coil (not shown) disposed in the circuit breaker CBA to trip the latter resulting in the disconnection of the protected section L from the transmission line.

Figure 4:
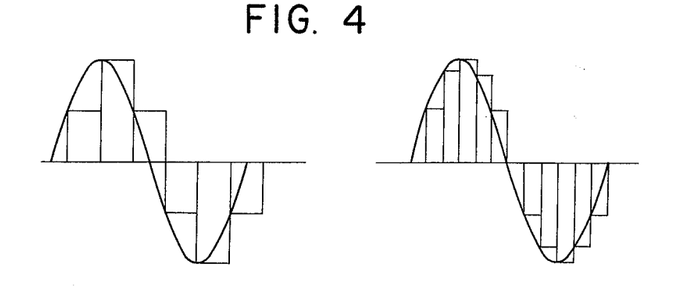
FIG. 4 is a pair of waveforms useful in explaining the high density sampling.

FIG. 4 illustrates one part of the fundamentals of the present invention and describes that as the sampling time period is shorter a reproduced waveform will be more faithfull to the original waveform, in this case, a sinusoidal waveform.

FIG. 4 shows on the lefthand portion one cycle of a sinusoidal wave and six samples sampled therefrom with a relatively long sampling time period. However the righthand portion of FIG. 4 shows ten samples sampled from the same sinusoidal wave with a shorter sampling time period.

A sampling time interval has previously corresponded to an electric angle of 30 degrees of the commercial frequency wave and been of 1.389 milliseconds for the commercial frequency of 60 hertzs whereas in the present invention the same is sufficient to correspond to an electrical angle of about 0.5 degree. That is, it is of 231.5 microseconds for the commercial frequency of 60 hertzs.

As an example, it is assumed in the current differential protection that, upon the occurrence of an external through-fault on the protected section which is supposed to be of the two terminal type only for purposes of explanation, a fault current therethrough is designated by A sin $\theta$. Under the assumed conditions, the worst case occurs with the sampling at one of the two terminals shifted from that at the other terminal by an electric angle of 0.5 degrees of the commercial frequency wave. An error current $\Delta A$ at that time may be expressed by $$\begin{aligned}\Delta A &= A\sin\theta - A\sin(\theta + 0.5°) \\ &= A\{(1 - \cos 0.5°)\sin\theta - \sin 0.5° \cos\theta\} \\ &= 8.727 \times 10^{-3} A\sin(\theta - 89.75°)\end{aligned} \quad (3)$$

Assuming that the fault current is of 200 ampers rms for the current transformer CT with rated secondary current of 5 amperes, the fault current $\Delta A$ is calculated at $$\begin{aligned}\Delta A &= 8.727 \times 10^{-3} \times \sqrt{2} \times 200\sin(\theta - 89.75°) \\ &= 2.468\sin(\theta - 89.75°)\end{aligned} \quad (4)$$

Accordingly the fault current $\Delta A$ in amperes results in $$\Delta A = 2.468 \quad (5)$$

for $$\theta = -0.25° \quad (6)$$

Therefore the restraint factor k in the inequality (1) has a mulfunction limit expressed by $$\frac{2.468/\sqrt{2} - T_o}{200} = \frac{1.745 - T_o}{200} \geq k \quad (7)$$

Figure 8:
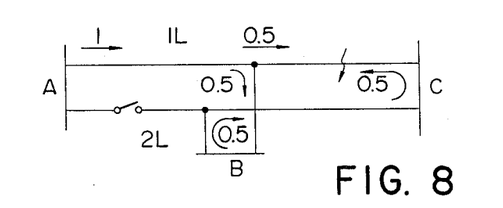
FIG. 8 is a diagram useful in explaining, by way of example, a fault developed within a protected line section including an efflux terminal.

It is further assumed that the systen is operated as shown in FIG. 8 wherein there are illustrated an influx 1 through a terminal A thereof, an efflux 0.5 through a terminal B thereof and an inflow 0.5 through a terminal C thereof. In order to determine or decide if an internal fault has occurred on the protected section 1L shown in FIG. 8, the ideal sampling will now be considered. In the assumed conditions, the vectorial sum of the currents through the respective terminals A, B and C is equal to a unity (1) and the scalar sum of those currents is equal to two (2). By substituting the vectorial and scalar sums into the inequality (1), the restraint factor giving the lower limit as to the operating conditions is calculated at $$\frac{1}{2}(1 - T_o) = k \quad (8)$$

The expressions (7) and (8) give a minimum taping magnitude $T_{omin}$ of a relay operated in accordance with the inequality (1) as follows:

$$T_{omin} \doteq 0.992 \text{ in ampere (rms)} \quad (9)$$

From the expression (9) it is seen that a tapping magnitude in the order of 1 ampere (rms) can be set to the relay.

Figure 5:
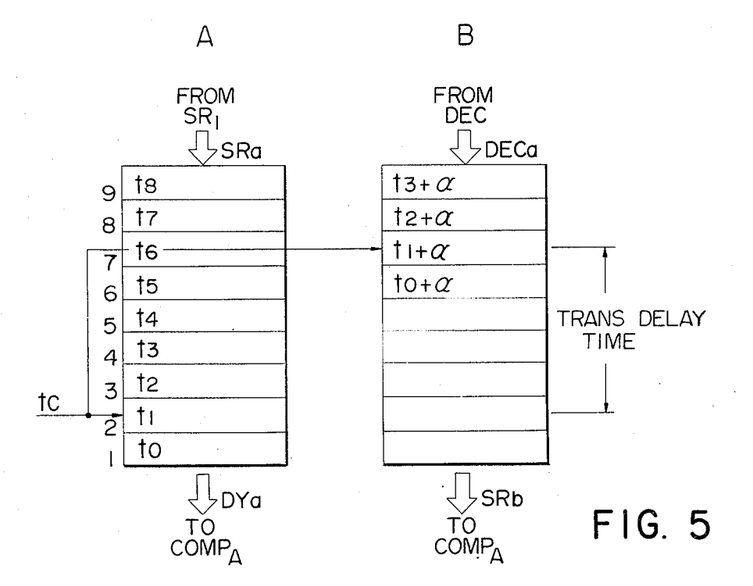
FIG. 5 is a chart useful in explaining the manner in which the synchronization is effect in accordance with the present invention.
Figure 6:
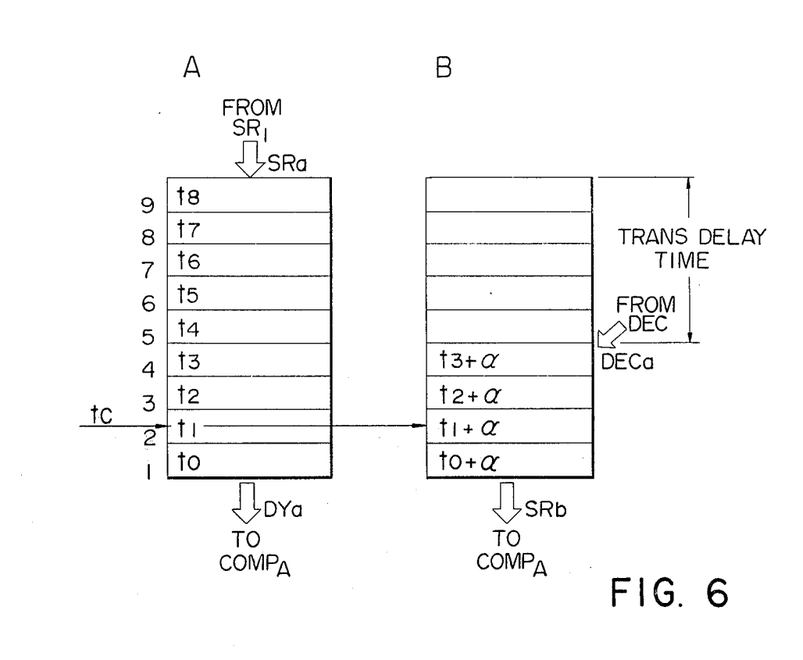
FIG. 6 is a chart similar to FIG. 5 but illustrating a modification of the synchronizing manner shown in FIG. 5.

FIGS. 5 and 6 show two embodiments according to the transmission delay correction mechanism forming another part of the fundamentals of the present invention and are useful in explaining the principles of the transmission delay corrector DY shown in FIG. 2.

The transmission delay corrector DY is perferably formed of a shift register required only to be prepared for the number of words enabled to correct a transmission delay. The transmission delay corrector DY is shown on the lefthand portion labelled A in FIG. 5 as including nine word positions 1, 2, 3, . . . , 9 in which the digitalized data sampled at sampling times $t_0$, $t_1$, $t_2$, . . . , $t_8$ at the terminal A are registered respectively. The transmission delay corrector DY is also shown in FIG. 5 as having the ninth position applied with the parallel signal $SR_a$ from the first buffer memory $SR_1$ and the first position from which the parallel signal $DY_a$ is applied to the processing unit $COMP_A$ in the manner as described above.

Also the second buffer memory $SR_2$ is shown on the righthand portion labelled B in FIG. 5 as including nine word positions and data sampled at sampling times $T_0+\alpha$, $t_1+\alpha$, $t_2+\alpha$, and $t_3+\alpha$ and registered at the seventh, eighth and ninth positions. Here $\alpha$ designates a time interval between the samplings effected at the terminals A and B. The second buffer memory $SR_2$ is further shown as having the ninth word position applied with the parallel signal $DEC_a$ from the decoder DEC and the first word position from which the parallel signal $SR_b$ is applied to the processing unit $COMP_A$ in the manner as described above.

For the sampling interval corresponding to the electrical angle of 0.5 degree of the frequency wave of the system, the sampling interval $\alpha$ in terms of time is of not less than 231.5 microseconds.

Assuming that $t_{SAMP}$ designates the sampling interval, $\alpha$ is calculated in terms of time and $t_d$ designates a transmission delay time, the transmission delay corrector DY is required to include the number of the word positions expressed by $t_d/t_{SAMP}$. However the transmission delay corrector DY may conveniently include an additional word portion for a redundant word.

When the sampling interval $\alpha$ is of 0.5 degree in the electrical angle of the frequency wave in the example illustrated in FIG. 5, the transmission delay time $t_d$ in microseconds holds the inequality $$926 < t_d < 1157.5 \tag{10}$$

By collecting both data sampled at the sampling time $t_1$ at the terminal A and registered in the second word position of the transmission corrector DY and those sampled at the sampling time $(t_1+\alpha)$ at the terminal B and registered in the seventh word position of the second buffer memory device $SR_2$ in response to the writing pulse $t_c$, as shown at arrowed lines in FIG. 5, the samplings at the terminals A and B can be maintained in synchronized relationship within limits pulled out of the sampling synchronization as defined by the inequality (10).

The process as described above is executed so that each of the signals $SR_a$ and $DEC_a$ applied to the transmission delay corrector DY and the second buffer memory $SR_2$ respectively is successively shifted from the ninth toward the first word position therethrough while data are collected by considering a difference in word position between the transmission delay corrector DY and the second buffer memory $SR_2$ corresponding to five word positions which are known. Therefore, the process is, so to speak, the correction of the transmission delay in the software manner.

On the contrary, FIG. 6 illustrates the correction of the transmission delay in the hardware manner. The arrangement illustrated is identical to that shown in FIG. 5 excepting that in FIG. 6 the signal $DEC_a$ from the decoder DEC is applied to the fourth word position of the second buffer memory $SR_2$. This is because the transmission delay between the terminals A and B is considered. Therefore like reference numerals and characters have been employed to identify the components identical to those shown in FIG. 5. It is noted in FIG. 6 that the second buffer memory $SR_2$ has data sampled at the sampling times $t_0+\alpha$, $t_1+\alpha$, $t_2+\alpha$, and $t_3+\alpha$ at the terminal B and registered in the fourth, third, second and first word positions thereof respectively.

In the arrangement illustrated, data are arranged to be, as the synchronized data, corrected from the second word positions of the transmission delay corrector DY and the second buffer memory device $SR_2$ in response to the writing pulse $t_c$ as shown at arrowed lines in FIG. 6.

Figure 7:
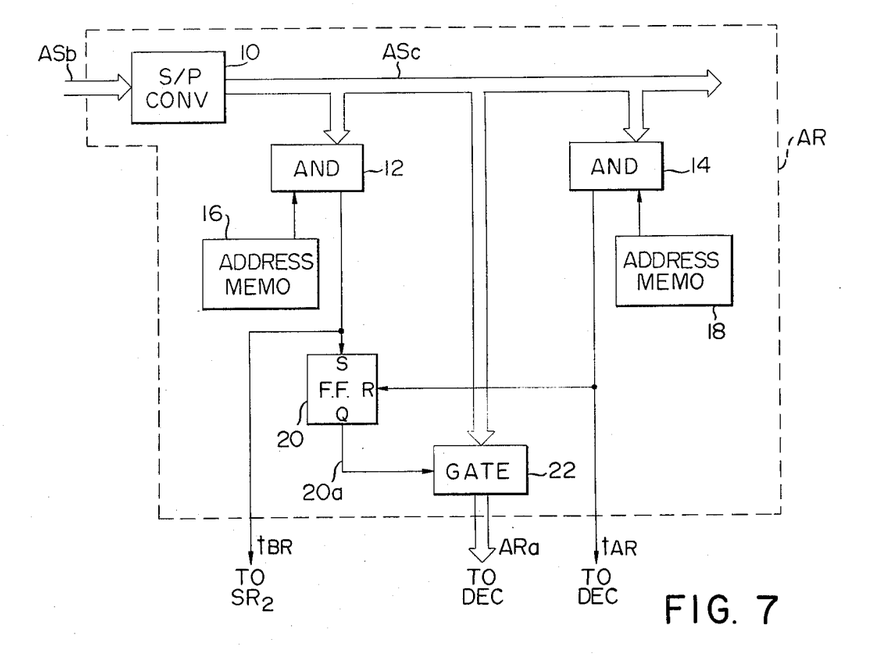
FIG. 7 is a block diagram of one embodiment according to the control signal generating unit of the present invention disposed in the receiver shown in FIG. 2.

FIG. 7 is a block diagram of a portion disposed in the receiver AR as shown in FIG. 2 to form the control pulses $t_{AR}$ and $t_{BR}$ of data transmitted from an associated terminal, in this case, the terminal B (not shown). The arrangement forms still another part of the fundamentals of the present invention and comprises a serial-parallel converter 10 receiving the series signal $AS_b$ through a receiving circuit (not shown) disposed in the receiver AR (not shown in FIG. 7), and a pair of AND gates 12 and 14 connected at one input to the serial-parallel converter 10, and at the other inputs to a pair of address memory circuits 16 and 18 for storing addresses $AD_1$ and $AD_2$ respectively. The AND gates 12 and 14 include respective outputs connected to a setting input S and a resetting input R to a FLIP-FLOP circuit 20 including an output Q connected to a gate circuit 12 to which the output of the serial-parallel converter 10 is also connected.

The outputs of the AND gates 12 and 14 deliver the control pulses $t_{BR}$ and $t_{AR}$ to the second buffer memory $SR_2$ and the decoder DEC respectively while the gate circuit 22 delivers the parallel signal $AR_a$ to the decoder DEC.

Figure 9:
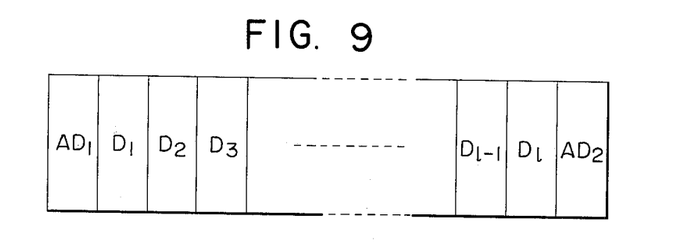
FIG. 9 is a diagram of a frame structure of current data received by the receiver shown in FIG. 2.

The serial-parallel converter 10 converts the serial signal $AS_b$ to a parallel signal $AS_c$ having a frame structure as shown in FIG. 9. As shown in FIG. 9, a frame starts with the address $AD_1$ indicating a frame synchronizing word and ends at the address $AD_2$ indicating the end of the frame while data $D_1$, $D_2$, $D_3$, . . . , $D_l$ are located between the addresses $AD_1$ and $AD_2$ and represent those concerning currents for respective phases of the system at the terminal B and the ON or OFF position of an associated circuit breaker disposed at the same terminal.

Each of the addresses $AD_1$ or $AD_2$ is of a value incapable of existing in the data $D_1$, $D_2$, . . . , $D_l$. For example, it is possible to form the addresses $AD_1$ and $AD_2$ of codes corresponding to a positive and a negative full scale while adjusting a maximum input to an analog-to-digital converter disposed at the terminal B so as to prevent the maximum input from equalling a full scale for the analog-to-digital conversion.

Referring back to FIG. 7, the signal ABC from the serial-parallel converter 10 is also of the frame as shown in FIG. 9. The address memory circuits 16 and 18 have stored therein concepts identical to the frame synchronizing word $AD_1$ and the end-of-frame word $AD_2$ respectively. As a result, the AND gate 12 produces an output of a binary ONE when the signal $A_{sc}$ is applied thereto. That output forms the control pulse $t_{BR}$ and also is applied to the setting input S to the FLIP-FLOP circuit 20 to set the latter. Therefore the AND gate 12 and the memory circuit 16 are operated to sense the initiation of the frame.

Then the data $D_1$, $D_2$, . . . , $D_l$ are successively applied to the gate circuit 22. The gate circuit 22 is formed of "AND" gates whose number is equal to the number of bits forming each of the data $D_1$, $D_2$, . . . , $D_l$, for example to 16. Thus the gate circuit 22 is gated with an output signal 20a from the output Q of the FLIP-FLOP circuit 20 to deliver successively the data $D_1$, $D_2$, . . . , $D_l$ to the decoder DEC as the signal $SR_a$.

Finally the end-of-frame word $AD_2$ reaches the AND gate 14 whereupon the AND gate 14 cooperates with the memory circuit 18 to sense the completion of the frame in the manner substantially identical to that described above in conjunction with the sensing of the initiation of the frame. As a result, the and gate 14 produces an output of a binary ONE. That output forms the control pulse $t_{AR}$ delivered to the decoder DEC and also it is applied to the resetting input R to the FLIP-FLOP circuit 20 to reset the latter. Therefore the FLIP-FLOP circuit 20 is prevented from delivering the output signal 20a to the gate circuit 22. Accordingly the arrangement of FIG. 7 is ready for the next succeeding operation.

Figure 10:
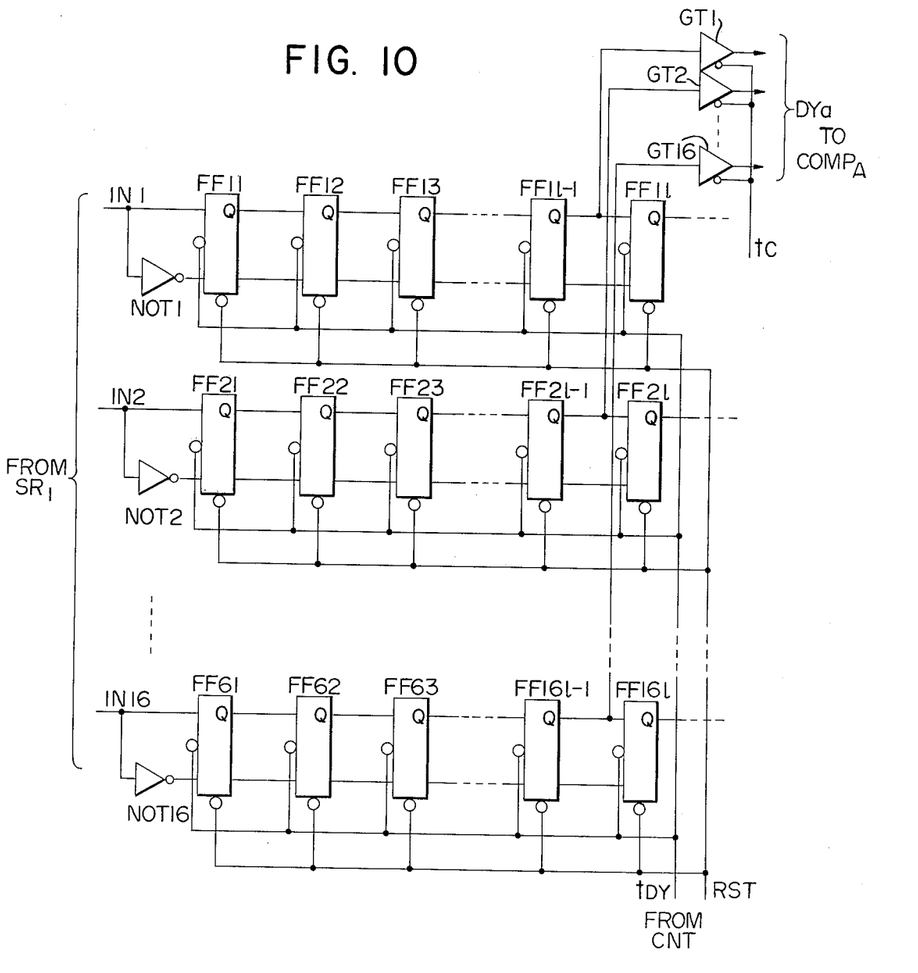
FIG. 10 is a circuit diagram of the details of the transmission delay corrector shown in FIG. 2.

FIG. 10 illustrates a circuit configuration of one embodiment according to the transmission delay corrector DY as shown in FIG. 2 forming still another part of the fundamentals of the present invention. The arrangement illustrated comprises a 16-bit 1-word shift register including sixteen inputs $IN_1$, $IN_2$, . . . , $IN_{16}$ receiving the signal $SR_a$ from the first buffer memory $SR_1$ having sixteen (16) bits arranged in parallel. Each input is connected to a setting input to a first one of an array of l FLIP-FLOP circuits serially interconnected and to a resetting input thereto through a NOT gate. In each array, each FLIP-FLOP circuit includes a pair of outputs (one of which is designated by the reference character Q) connected to a setting and a resetting input to the next succeeding FLIP-FLOP circuit. Each of the FLIP-FLOP circuit is designated by the reference characters FF suffixed with the serial number identifying the input coupled to the same and followed by the serial number identifying its location in the array. Also each of the NOT gates is designated by the reference characters NOT suffixed with the serial number identifying the input connected thereto. For example, FF21 designates the first FLIP-FLOP circuit connected at the setting input to the input $IN_2$ and at the resetting input to the same input through the NOT gate $NOT_2$. Further each of the FLIP-FLOP circuits includes a pair of clock input applied with clock pulses $t_{DY}$ and $R_{ST}$.

In each array, the (l−1)th FLIP-FLOP circuit includes the output Q connected to an individual gate circuit $GT_1$, $GT_2$, ..., or $GT_{16}$ on the assumption that the the transmission delay suffered by the signal $AS_b$ can be corrected with (l−1) words. Each of the gate circits delivers the Q outputs from the mating (l−1)th FLIP-FLOP circuit to the processing unit $COMP_A$ when the same is receiving the control signal $t_c$ from the processing unit $COMP_A$. Those Q outputs form the parallel signal $DY_a$.

Figure 11:
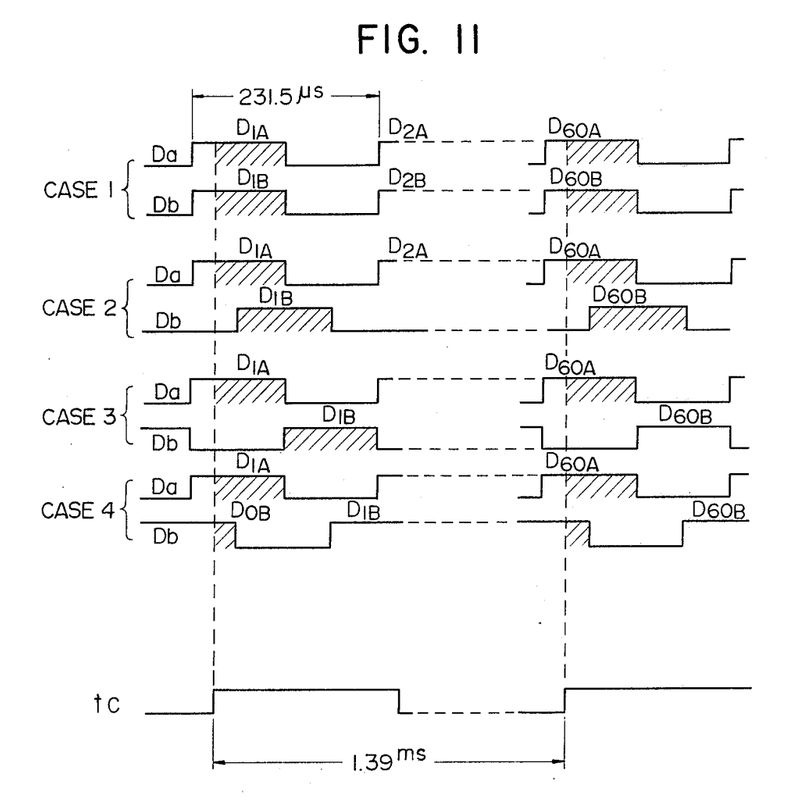
FIG. 11 is a graph illustrating waveforms useful in explaining more minutely the manner in which the synchronization is effected in accordance with the present invention.

When the transmission delay corrector DY and the second buffer memory device $SR_2$ write the signals $DY_a$ and $SR_B$ into the processing unit $COMP_A$ respectively in response to the control signal $t_c$ from the latter, written portions of the two signals may be temporally shifted from each other as determined by the phase relationship therebetween as shown in FIG. 11. In FIG. 11 $D_a$ designates waveform at the terminal A including data $D_{1A}$, $D_{2A}$, ..., $D_{60A}$ sampled from a current for a phase A through the terminal A at sampling times, 1t, 2t, ..., 60t during the pulse repetition period of 1.39 milliseconds of the writing clock pulse $t_c$ and $D_b$ designates waveform similarly obtained at the terminal B and including data $D_{1B}$, $D_{2B}$, ..., $D_{60B}$ similar to those $D_{1A}$, $D_{2A}$, ..., $D_{60A}$ respectively. FIG. 11 also shows four differences between the sampling time at the terminal A and that at the terminal B labelled CASE1, CASE2, CASE3 and CASE4 respectively. CASE1 describes the data sampled in the completely synchronized relationship or with the same phase at the terminals A and B, and CASE2 describes a phase difference of 90 degrees between the data sampled at the terminal A and those sampled at the terminal B. Similarly CASE3 describes a phase difference of 180 degrees and CASE4 describes a phase difference of 270 degrees.

It is assumed only for purposes of illustration that the data at the terminal A form a reference and that the data at the terminal B have no transmission delay. It is also assumed that all the data shown in FIG. 11 as being in the form of rectangular pulses have the duty ratio of 50% and that the writing clock pulse $t_c$ has a pulse width or a time period of 231.5 microseconds having a high level as shown in FIG. 11.

If the writing clock pulse $t_c$ has the temporal relationship with the sampled pulses as shown in FIG. 11, then each of the rectangular pulses includes a hatched portion thereof written into the processing unit $COMP_A$. This is because a data enabling time period is formed of a time interval for which the writing clock pulse $t_c$ is at its high level.

In each of CASES 1, 2, 3 and 4, there is a fear that two data or rectangular pulses are collected within the data enabling time period. However the data can be collected by a circuit designed and constructed so that if a rise of any rectangular pulse is sensed within the data enabling time period that the latter is disabled to collect that rectangular pulse and the following and that this disabling is released at the fall of the writing clock pulse $t_c$.

The present invention has several advantages. For example, the present invention can ensure the protection comparable with that obtained by the prior art practice without the synchronizing control signal from a predetermined master station transmitted to subordinate stations thereof. At each of electric stations connected to an associated transmission line the sampling can be effected independently of the other stations. Therefore it is not only unnecessary to use means for ensuring the complicated synchronization but also a synchronizing signal circuit can be decentralized. This results in a large increase in reliability of the system because it can be avoided to disable the entire system due to malfunction of the synchronizing circuit as in the simultaneous synchronization system. Further the present invention can readily cope with a change in number of terminals of the system.

While the present invention has been illustrated and described in conjunction with a single preferred embodiment thereof it is to be understood that numerous changes and modifications may be resorted to without departing from the spirit and scope of the present invention. For example, the filter F as shown in FIG. 2 may be omitted with the sampling frequency extremely high. This will readily be understood from the fact that, when the sampling frequency is infinitely high, the sampling results in the original analog waveform itself. Also the sampling and holding circuit S/H shown in FIG. 2 may be omitted because the sampling is enabled within a predetermined range of errors at a high conversion speed of the analog-to-digital converter A/D connected to the sampling and holding circuit S/H. Further while the present invention has been described in conjunction with a protective system for protecting a section of a transmission line extending between two electric stations it is to be understood that the same is equally applicable to a variety of protective devices disposed in a single electric station. Examples of such protective devices involve vectorial calculation type relays, for example, directional relays and impedance relays relying on the voltage and the current, and bus transformer protection relays relying on one current and the other current.

What is claimed is:

1. A multi-terminal protective relay system for protecting a transmission line on the current differential principles comprising, at each of a plurality of terminals connected to a transmission line, means for drawing a current in the analog form flowing therethrough, analog-to-digital converter means, connected to said current drawing means, encoder means connected to said analog-to-digital converter means, transmitter means connected to said encoder means, receiver means, decoder means connected to said receiver means, first buffer memory means connected to said analog-to-digital means, second buffer memory means connected to said decoder means, transmission delay corrector means connected to said first buffer memory means, clock means for delivering control clock pulses to said analog-to-digital converter means, said encoder means, said transmitter means, said first buffer memory means, and said transmission delay corrector means, and processing means connected to both said transmission delay corrector means and said second buffer memory means thereby to eliminate the necessity of preparing a synchronizing signal for said analog-to-digital converter means disposed at said plurality of terminals.

* * * * *